United States Patent
Kumasaka et al.

(10) Patent No.: US 7,374,473 B2
(45) Date of Patent: May 20, 2008

(54) TEXTURING SLURRY AND TEXTURING METHOD BY USING SAME

(75) Inventors: Noriyuki Kumasaka, Tokyo (JP); Yuji Horie, Tokyo (JP); Mitsuru Saito, Tokyo (JP); Kazuei Yamaguchi, Tokyo (JP)

(73) Assignee: NIHON Micro Coating Co., Ltd., Tokyo (JP)

( * ) Notice: Subject to any disclaimer, the term of this patent is extended or adjusted under 35 U.S.C. 154(b) by 0 days.

(21) Appl. No.: 11/605,497

(22) Filed: Nov. 27, 2006

(65) Prior Publication Data

US 2007/0123153 A1    May 31, 2007

(30) Foreign Application Priority Data

Nov. 28, 2005  (JP) .............................. 2005-341337

(51) Int. Cl.
 *B24B 29/00*   (2006.01)
 *B24B 21/04*   (2006.01)
(52) U.S. Cl. ........................................ 451/36; 451/63
(58) Field of Classification Search ................. 451/36, 451/37, 41, 28, 57, 63, 307, 173
 See application file for complete search history.

(56) References Cited

U.S. PATENT DOCUMENTS

| | | | |
|---|---|---|---|
| 4,475,981 A * | 10/1984 | Rea .............................. 216/89 |
| 5,207,759 A * | 5/1993 | Mehmandoust et al. ....... 451/63 |
| 5,482,695 A * | 1/1996 | Guschin et al. .............. 423/446 |
| 5,899,794 A * | 5/1999 | Shige et al. ................... 451/41 |
| 5,916,955 A * | 6/1999 | Vereschagin et al. ........ 524/495 |
| 6,126,515 A * | 10/2000 | Horie et al. ................... 451/36 |
| 6,280,489 B1 * | 8/2001 | Horie et al. ................... 51/307 |
| 6,533,644 B1 * | 3/2003 | Horie et al. ................... 451/36 |
| 6,972,135 B2 * | 12/2005 | Homola ...................... 427/130 |

* cited by examiner

*Primary Examiner*—Robert A. Rose
(74) *Attorney, Agent, or Firm*—Beyer Weaver LLP

(57) ABSTRACT

Texturing slurry for texturing a substrate for a magnetic hard disk is obtained by dispersing abrading particles of a specified kind in a specified kind of dispersant. The abrading particles include diamond clusters formed with artificial diamond particles with primary particle diameter of 20 nm or less and surrounded by impurities containing chlorine at a certain ratio. The cluster diameter and the average cluster diameter of the diamond clusters are each within a specified range. For texturing a substrate surface, the substrate is rotated, texturing slurry of this invention is supplied to the surface and a texturing tape of a specified kind is pressed against the substrate surface while it is caused to run.

6 Claims, 2 Drawing Sheets

TEXTURING SLURRY AND TEXTURING METHOD BY USING SAME

This application claims priority on Japanese Patent Application 2005-341337 filed Nov. 28, 2005.

BACKGROUND OF THE INVENTION

This invention relates to a texturing method for forming texturing marks on the surface of a substrate for a magnetic hard disk and to slurry for using in such a method.

Magnetic hard disks are being used as a medium for recording data such as sound and image for data recording and reproducing apparatus such as computers. A magnetic hard disk is generally produced by mirror-polishing the surface of a non-magnetic substrate such as a glass substrate or an aluminum substrate with Ni—P plating, carrying out a texturing process on its surface to form approximately concentric circular texturing marks thereon and sequentially forming a magnetic layer, a protective layer, etc. on this textured surface by using a known thin-film technology such as sputtering.

As known to persons skilled in the art, the texturing process is for forming approximately concentric circular line marks on the surface of a magnetic hard disk similar to the texturing marks formed on the surface of the substrate in order to prevent the adsorption of the magnetic head to the magnetic hard disk.

For the purpose of carrying out magnetization of a magnetic hard disk accurately for accurate recording and reproduction, the surface of the magnetic hard disk must satisfy the following four topological conditions.

(1) Firstly, the pitch of the line marks formed on the surface of the magnetic hard disk must be made smaller. In other words, if the number of line marks per unit length in the radial direction of the disk is increased, the number of protruding parts of the linear marks per unit area facing the magnetic head (or the surface portions of the magnetic hard disk near the magnetic head) increases such that it becomes possible to carry out the magnetization of the magnetic hard disk more accurately. In recent years, the number of line marks per unit length in the radial direction of the disk, or the line density, is coming to be required to be 40 lines/μm or more.

(2) Secondly, deep indentations (deep indentations of line marks and scratches) must not be formed on the surface of the magnetic hard disk. This is because, if these indented parts are too deep, magnetic flux from the magnetic head does not reach the magnetic layer near the bottom of the indented parts and cannot magnetize these parts. This makes accurate recording and reproduction impossible. It is also because a magnetic layer may fail to be formed near the bottom of the indented parts at the time of forming a thin film by sputtering.

(3) Thirdly, abnormal protrusions reaching the floating distance of the magnetic head must not be formed such that the magnetic head can fly at a low height. This is because, if the magnetic head collides with such protrusions, the magnetic head may be damaged and the pieces of the protrusions will become attached to the surface of the magnetic hard disk such that accurate recording to and reproduction from the magnetic hard disk become impossible. In recent years, floating distances of 10 nm or less are being required.

(4) Fourthly, the surface roughness of the magnetic hard disk must be made low such that the magnetic head can slide smoothly on the surface of the magnetic hard disk after landing thereon and before floating up therefrom.

In summary, it is required to form line marks having indentations with an appropriate depth and protrusions with an appropriate height, and such topological surface conditions of a magnetic hard disk depends largely on the texturing process carried out on the surface of its substrate.

In view of the above, it is coming to be required in recent years to make the average surface roughness of the substrate within a range between 3 Å and 6 Å and to form texturing marks with line density of 40 lines/μm or greater on the substrate surface by a texturing process, and it is further being required that such texturing marks be formed uniformly and clearly on the substrate surface.

As described in Japanese Patent Publication Tokkai 2005-131711, texturing is conventionally carried out by using free abrading particles, or by supplying slurry having abrading particles dispersed therein to the surface of the substrate and pressing a texturing tape onto the surface of the substrate so as to form approximately concentric circular texturing marks on the substrate surface.

Porous tapes made of a woven or non-woven cloth material or a foamed material capable of taking in polishing debris generated by the texturing process and acting elastically on the substrate surface are commonly used as the texturing tape.

As described in Japanese Patent Publications Tokkai 6-121923 and 2005-131711, furthermore, texturing slurry containing diamond clusters as abrading particles is being used. Diamond clusters mean a bunched combination of particles of artificial diamond obtained by an explosion shock method such as described in Japanese Patent Publications Tokkai 6-121923 and 2005-131711, by Eiji Oosawa in "Details of nano-diamond by oxygenless explosion method," Journal of Toryu Gakkai, Vol. 47, No. 8 (August, 2003) at pages 414-417 and by Kotaro Hanada in "Characteristics of diamond clusters and their application to solid lubrication," ibid., Vol. 47, No. 8 (August, 2003) at pages 422-425.

Mechanism of texturing by diamond clusters will be explained first. Diamond clusters dispersed as polishing materials in texturing slurry are carried inside the surface portion of the texturing tape being pressed against the surface of the magnetic hard disk substrate during the texturing process and are thereby pressed against the substrate surface. Larger diamond clusters break up as they are carried in the surface portion of the texturing tape and become diamond clusters of an appropriate size while being pressed against the substrate surface. These diamond clusters act on and texture the substrate surface while being carried inside the surface portion of the texturing tape.

Since diamond clusters are formed with extremely small artificial diamond particles with primary particle diameter of 20 nm or smaller, it used to be considered possible to reduce the average surface roughness of the substrate and to form texturing marks at a high line density by highly purifying the diamond clusters (that is, by making the purity of diamond clusters closer to that of natural diamond).

If texturing slurry having a polishing material comprising diamond clusters is used to texture a substrate for a magnetic hard disk, it is possible to form texturing marks at a line density of 40 lines/μm or more on the substrate surface but spots appear, the texturing marks being not uniform and becoming locally unclear. Thus, the current problem is that there are fluctuations in the quality of the products after the texturing process and that it is not possible to product products of a specified quality level.

In the technical field of texturing, therefore, the development of a new technology is being required for forming texturing marks uniformly and clearly on the surface of a substrate for a magnetic hard disk with average surface roughness in the range of between 3 Å and 6 Å and line density of 40 lines/μm or greater without generating any spots.

SUMMARY OF THE INVENTION

It is therefore an object of this invention to provide a method of texturing and texturing slurry for using in such a method, capable of forming texturing marks uniformly and clearly on the surface of a substrate for a magnetic hard disk with average surface roughness in the range of between 3 Å and 6 Å and line density of 40 lines/μm or greater without generating any spots.

The inventors herein considered the cause for the generation of such unwanted spots as follows. Diamond clusters are pressed against the surface of the substrate only while they are being held in the surface portion of a porous tape which is pressed against the surface of the substrate. Since this tape is pressed against the surface of the rotating substrate, the diamond clusters at the surface of the tape are caused to act on and abrade the substrate surface to form approximately concentric circular texturing marks.

Particles of artificial diamond obtained by an explosion shock method have rounded corners, and there are no sharp edges. Diamond clusters are clusters of such diamond particles, having an indefinite shape without sharp edges, but they have protruding parts. During a texturing process, these protruding parts engage with the surface portion of the porous tape so as to support the clusters in the surface part of the tape.

Since diamond clusters have indefinite shapes as a whole, the force for attaching them temporarily to the tape is individually different. Moreover, the force for the attachment due only to the protruding parts of the diamond clusters is not sufficiently strong such that the density of diamond clusters supported in the surface part of the tape also varies locally, and this is believed to be the cause of spots to be generated. It is also believed that the diamond clusters in the texturing slurry are in a condition of easily being taken into the internal part of the tape.

On the basis as described above, the inventors herein discovered that texturing marks can be formed uniformly and clearly without forming spots on the surface of a substrate for a magnetic hard disk such that the average surface roughness is in the range of between 3 Å and 6 Å and line density of 40 lines/μm or greater if a specified density of chlorine is included in the impurities of the diamond clusters, not by merely purifying the diamond clusters made of very small particles of artificial diamond generated by an explosion shock method, such that products of a specified quality level can be obtained with reliable repeatability.

Texturing slurry according to this invention is for texturing a substrate for a magnetic hard disk and is characterized as comprising abrading particles of a specified kind and a specified kind of dispersant for dispersing the abrading particles.

The abrading particles according to this invention comprise diamond clusters formed with artificial diamond particles with primary particle diameter of 20 nm or less and surrounded by impurities that are attached thereto. The density of non-diamond carbon in the impurities surrounding the artificial diamond particles is 95% or more and 99% or less. The density of chlorine in the impurities other than non-diamond carbon of the diamond clusters is 0.5% or more. The cluster diameter of the diamond clusters is 30 nm or more and 500 nm or less, and the average cluster diameter of the diamond clusters is 30 nm or more and 200 nm or less. The texturing slurry contains these abrading particles by 0.005 weight % or more and 0.5 weight % or less.

The dispersant according to this invention comprises water and an additive, this additive according to this invention containing one or more selected from the group consisting of glycol compounds, higher aliphatic amides, organic phosphates and surfactants. The texturing slurry contains such additive by 1 weight % or more and 10 weight % or less and has pH value of 8 or greater.

A method of this invention for texturing a substrate for a magnetic hard disk is characterized as comprising the steps of rotating the substrate, supplying texturing slurry of this invention as described above to surface of the substrate, pressing a texturing tape onto the surface of the substrate and running this texturing tape. The texturing tape may comprise a woven, non-woven, raised or flocked cloth material. At least a surface area of this cloth material for being pressed against the surface of the substrate comprises fibers with thickness 0.1 μm or greater and 5.0 μm or less.

With texturing slurry of this invention and by a texturing method of this invention, it is possible to form texturing marks uniformly and clearly on a substrate for a magnetic hard disk with average surface roughness in the range of between 3 Å and 6 Å and line density of 40 lines/μm or greater without leaving spots.

DETAILED DESCRIPTION OF THE INVENTION

The invention relates to a method of texturing and texturing slurry for using in such a method, capable of forming texturing marks uniformly and clearly on the surface of a substrate for a magnetic hard disk with average surface roughness in the range of between 3 Å and 6 Å and line density of 40 lines/μm or greater and preferably 60 lines/μm or greater without leaving any spots.

Figure 1B:
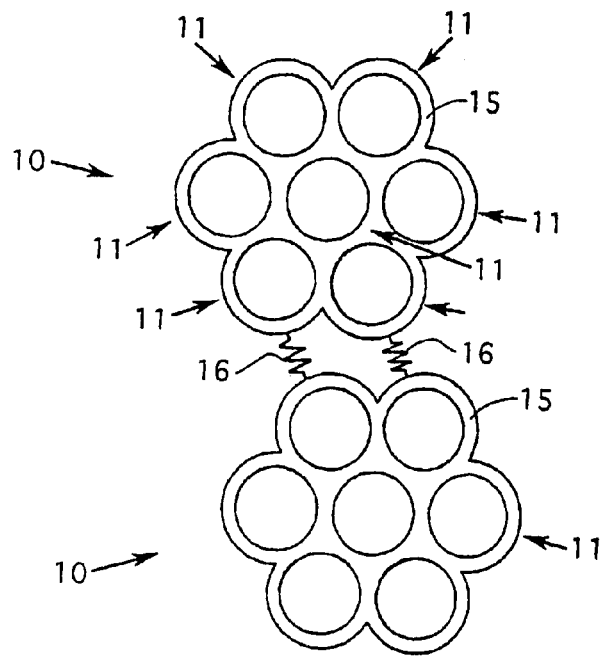
Figure 2A:
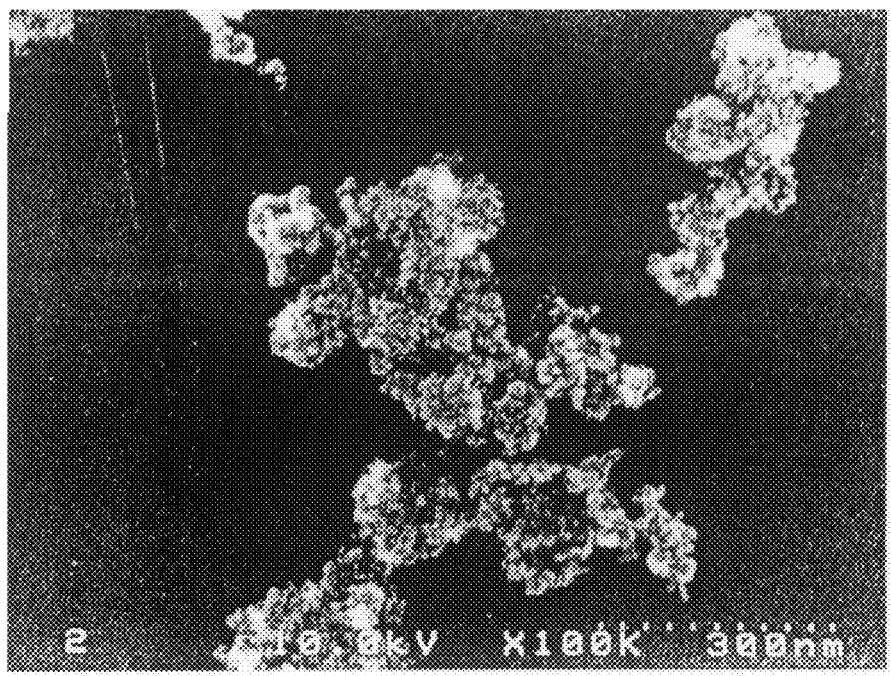
FIG. 2A is an electron microscope photograph of diamond clusters of abrading particles contained in texturing slurry of this invention.
Figure 2B:
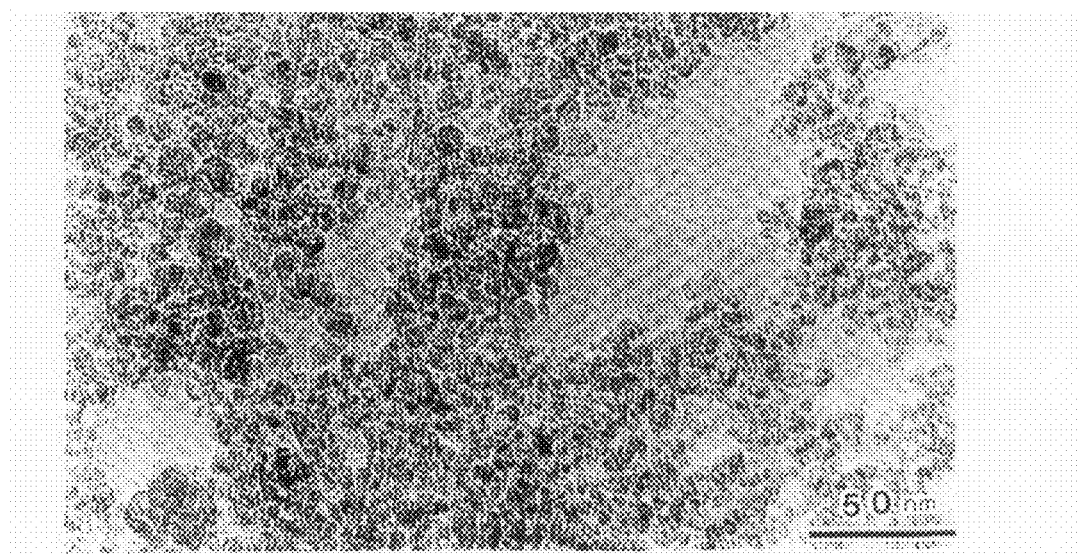
FIG. 2B is an enlargement of a portion of the photograph of FIG. 2A.

Texturing slurry according to this invention comprises a abrading particles and a dispersant that disperses the abrading particles. The abrading particles contained in texturing slurry according to this invention comprise diamond clusters 10 having artificial diamond particles 11 with primary particles of diameter 20 nm or less connected in a cluster form as shown in FIG. 1B. Artificial diamond particles 11 are rounded as shown in FIG. 2B, having no angular corners. Diamond clusters 10 are indefinitely shaped, having no shape edges, but there are protrusions as shown in FIG. 2A.

Figure 1A:
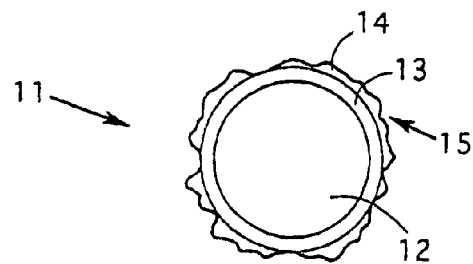
FIG. 1A is a sectional view of an artificial diamond particle of abrading particles contained in texturing slurry of this invention and FIG. 1B is a sectional view of a diamond cluster of abrading particles contained in texturing slurry of this invention.

As shown in FIG. 1A, artificial diamond particles 11 have onion-like carbon particles 13 formed around a diamond (carbon) core 12, a chemically active boundary layer 14 being formed around the onion-like carbon particles 13. Impurities 15 are defined as including these onion-like carbon particles 13 the chemically active boundary layer 14. The chemically active boundary layer 14 includes carbon atoms, other atoms, functional groups, chemical materials that came to be attached by a chemical process (such as the acid treatment to be described below) and metallic particles.

According to this invention, the density of non-diamond carbon contained in the impurities 15 in the diamond clusters 10 is within the range between 95% and 99%, and the density of chlorine contained in the impurities 15 in the diamond clusters 10 other than non-diamond carbon is 0.5% or more and preferably within the range between 0.5% and 3.5%. If the density of chlorine is less than 0.5%, the diamond clusters 10 become taken into the porous taper too easily during a texturing process and it becomes difficult to maintain the diamond clusters 10 in the surface part of the tape where they act on the substrate surface to be textured. As a result, the abrading power is adversely affected and it becomes easier to generate spots.

The diameter of the diamond clusters 10 is within the range between 30 nm and 500 nm and preferably between 30 nm and 350 nm. The average cluster diameter (D50) is within the range between 30 nm and 200 nm. If the diameter and the average cluster diameter (D50) of the diamond clusters 10 is less than 30 nm, the abrading power becomes insufficient, the time required for the texturing process becomes too long and the texturing marks formed on the surface of the substrate becomes unclear. If the diameter of the diamond clusters exceeds 500 nm and their average cluster diameter (D50) exceeds 200 nm, scratches come to be formed on the surface of the substrate, the surface of the substrate becomes rough and the magnetic head becomes unable to slide smoothly on the surface of the magnetic hard disk.

The content of the abrading particles is within the range between 0.005 weight % and 0.5 weight % with respect to the total weight of the texturing slurry and more preferably between 0.005 weight % and 0.1 weight %. If it is less than 0.005 weight %, the abrading power becomes too weak, the time required for the texturing process becomes too long and unwanted unevenness appears on the surface of the substrate. The texturing marks formed on the substrate surface also become unclear. If the content exceeds 0.1 weight %, the substrate surface becomes rough and the magnetic head becomes unable to slide smoothly on the surface of the magnetic hard disk.

The dispersant comprises water and an additive which is one or more kinds selected from glycol compounds, higher aliphatic amides, organic phosphates and surfactants. The content of the additive is within the range between 1 weight % and 10 weight % with respect to the total weight of the texturing slurry.

Glycol compounds have affinity with the abrading particles and serve as a dispersant. If glycol compounds are used, a dispersant can be formed uniformly since they serve to reduce the viscosity of the dispersant as it is being prepared. Since they have affinity with water, furthermore, a glass substrate can be efficiently washed after the polishing process. Examples of glycol compound that may be used according to this invention include alkylene glycol, polyethylene glycol, polypropylene glycol and diethylene glycol butyl ether. The content of glycol compounds is preferably 60 weight % or less with respect to the whole of the additive.

Higher aliphatic amides function as a polishing accelerator for increasing the speed of polishing. Examples of higher aliphatic amide that may be used according to this invention include oleic acid diethanolamide, stearic acid diethanolamide, lauric acid diethanolamide, ricinolic acid diethanolamide, ricinolic acid isopropanolamide, ersinic acid diethanolamide, and tol fatty acid diethanolamide. Those having 12-22 carbon atoms are preferred. The content of higher aliphatic amide is preferably 60 weight % or less with reference to the whole of the additive.

Organic phosphates have the function of inhibiting the generation of abnormal protrusions (burrs formed by polishing debris becoming attached to the substrate surface) on the substrate surface. Organic phosphates are esters obtainable by replacing the hydrogen of phosphoric acid ($H_3PO_4$) with alkyl group or allyl group. Phosphoric acid salt of polyoxyethylene nonylphenolether may be used as an example. The content of organic phosphate is preferably 40 weight % or less with reference to the whole of the additive.

Surfactants have the function of improving the dispersive characteristic of the abrading particles. Nonionic or anionic surfactants may be used. The content of surfactant is preferably 20 weight % or less with reference to the whole of the additive.

The texturing slurry is alkaline and its pH value is 8 or greater. If the pH value of the texturing slurry is less than 8, the abrading particles precipitate in the texturing slurry. The pH value of the texturing slurry is preferably within the range between 8 and 10.

A plurality of diamond clusters may aggregate within the texturing slurry to form aggregated diamond clusters.

To obtain abrading particles of this invention, diamond clusters of artificial diamond with primary particle diameter 20 nm or less surrounded by impurities are generated by an explosion shock method. Non-diamond carbon in this case includes not only onion-like carbon particles but also residual carbon (non-reacted graphite) after the cluster-forming process.

Next, the impurities are removed such that the density of non-diamond carbon contained in the impurities of the diamond clusters will be within the range between 95% and 99% and the density of chlorine contained in the impurities other than non-diamond carbon of the diamond clusters will be within the range between 0.5% and 3.5% such that abrading particles of this invention are obtained.

The production method of this invention includes a classification step for classifying the diamond clusters after the impurity-removing step. This classification step is a step wherein the diamond clusters after the impurity-removing step are classified after being washed. The classification step may be carried out by a dry or wet method by using a centrifugal separator of a known kind. By carrying out this step, diamond clusters having a specified average cluster diameter can be obtained according to a desired degree of accuracy. It is to be noted that the roughness of the processed surface becomes smaller if the average cluster diameter is reduced.

The aforementioned classification step includes the step of separating out of diamond clusters after the impurity-removing process those having cluster diameters within the range between 30 nm and 500 nm and average cluster diameter (D50) within the range between 30 nm and 200 nm. If the centrifugal force applied on the diamond clusters by means of the centrifugal separator in this process is changed in a stepwise fashion, it is possible to separate out diamond clusters with cluster diameters within the range between 30 nm and 500 nm and the average cluster diameters (D50) of 80 nm, 120 nm and 150 nm in a stepwise fashion.

The cluster-forming step is the step for using an explosion shock method to form diamond clusters with artificial diamond particles surrounded by impurities combined together, as explained above.

The explosion shock method is a method of forming diamond artificially by means of a force of explosion of an explosive. Artificial diamond may be obtained by compressing a mixture of materials for diamond including carbon (graphite) and metallic powder of copper and iron at a high temperature and high pressure by means of the shock waves generated by the explosion of an explosive (the graphite shock-wave compression method) or by exploding an explosive such as TNT, RDX and HMX usable as a source of carbon within a container filled with helium gas (the oxygenless explosion method).

Diamond clusters formed by an explosion shock method contain onion-like carbon particles and also have impurities such as metals like copper and iron and non-reacted carbon (graphite) attached thereto. Combinations of a plurality of diamond clusters 10 joined together by a binding force 16 as shown in FIG. 1B are also produced by an explosion shock method.

The impurity-removing process of this invention includes an acid treatment process by using a condensed acid of one or more kinds selected from perchloric acid ($HClO_4$), condensed sulfuric acid ($H_2SO_4$), condensed nitric acid ($HNO_3$) and condensed hydrochloric acid (HCl) to subject the diamond clusters after the cluster-generating process to an acid treatment. The acid treatment in the above at least includes the step of using a condensed acid containing chlorine to subject the diamond clusters to an acid treatment. In this manner, the chemically active boundary layer 14 can be formed around the onion-like carbon 13 as shown in FIG. 1A.

For example, a condensed acid such as perchloric acid is used to remove non-reacted graphite (non-diamond carbon) from around diamond clusters first and a mixture of condensed nitric acid and condensed sulfuric acid is used to remove metals (mainly Cu, Fe, Cr and Ti) from diamond clusters. A mixture of condensed nitric acid and condensed sulfuric acid is further used to partially remove non-diamond carbon (such as onion-like carbon and non-reacted graphite) from diamond clusters.

In this acid treatment, the density of non-diamond carbon contained in the impurities and the density of chlorine contained in the impurities other than non-diamond carbon of diamond clusters can be adjusted by varying the processing temperature, processing time and the time during which it is left standing. It is also possible to form hydrophilic atoms such as chlorine and oxygen or hydrophilic atom groups such as hydroxyl groups, carboxyl groups or carbonyl groups around diamond clusters so as to provide hydrophilic characteristic.

The impurity-removing process includes a process for mechanically crushing the diamond clusters prior to the acid treatment process.

Diamond clusters generated by the explosion shock method include those that are formed with small diamond clusters bound together or artificial diamond particles bound together by a weak binding force (such as indicated by numeral 16 in FIG. 1B). These small diamond clusters and artificial diamond particles that are bound together by such a weak binding force become dissociated easily either before they are used as abrading particles or during the texturing process and easily become taken into the interior of the porous tape during the processing as the impurities not subjected to the acid treatment become exposed such that the density of non-diamond carbon contained in the impurities of diamond clusters or the density of chlorine contained in the impurities other than non-diamond carbon changes and becomes outside the aforementioned range.

It is for this reason that small diamond clusters and artificial diamond particles that are bound together by a weak binding force are separated from diamond clusters by a crushing process which may be carried out by using a crushing machine of a known kind such as a ball mill, an impact mill, an oscillation mill and a planetary mill.

As a result of this crushing process, metals such as copper and iron come to be attached to diamond clusters as impurities and since the artificial diamond particles which were positioned inside diamond clusters prior to the crushing process come to be externally exposed, this means that diamond clusters after the crushing process include not only the impurities that are generated by the crushing process but also those newly exposed impurities generated by the cluster generating process.

These impurities are removed from diamond clusters by the aforementioned acid treatment such that density of non-diamond carbon in the impurities of diamond clusters will be within the range between 95% and 99% and the density of chlorine in the impurities other than non-diamond carbon will be 0.5% or greater (or preferably within the range between 0.5% and 3.5%).

Prior to this crushing process, those of diamond clusters after the aforementioned cluster forming process having diameters within the range between 30 nm and 500 nm may be separated away. In this case, separated diamond clusters with diameters within the range between 30 nm and 500 nm are crushed by the crushing process.

Alternatively, diamond clusters may be mechanically crushed (crushing process) after the acid treatment process. In this case, in order to remove the newly generated impurities after the crushing process, condensed acid of one or more kinds selected from perchloric acid, condensed sulfuric acid, condensed nitric acid and condensed hydrochloric acid is used to subject the diamond clusters after the crushing process to a second acid treatment (second acid treatment process). The second acid treatment process, like the aforementioned acid treatment process, includes the process of carrying out an acid treatment on diamond clusters by using a condensed acid at least including chlorine.

Prior to this crushing process, those of diamond clusters after the aforementioned acid treatment process having diameters within the range between 30 nm and 500 nm may be separated away. In this case, diamond clusters separated after the acid treatment process and having diameters within the range between 30 nm and 500 nm are crushed by the crushing process and small diamond clusters and artificial diamond particles bound by a weak binding force are subjected to the acid treatment of the second acid treatment process after they are separated from diamond clusters.

Texturing slurry according to this invention may be produced by adding such abrading particles obtained as described above into water, dispersing the abrading particles in water by using ultrasonic waves, thereafter adding an additive thereto, and again using ultrasonic waves to further disperse the abrading particles in the dispersing medium.

Next, texturing methods of this invention by using texturing slurry as described above for forming texturing marks on the surface of a substrate for a magnetic hard disk will be explained.

Figure 3:
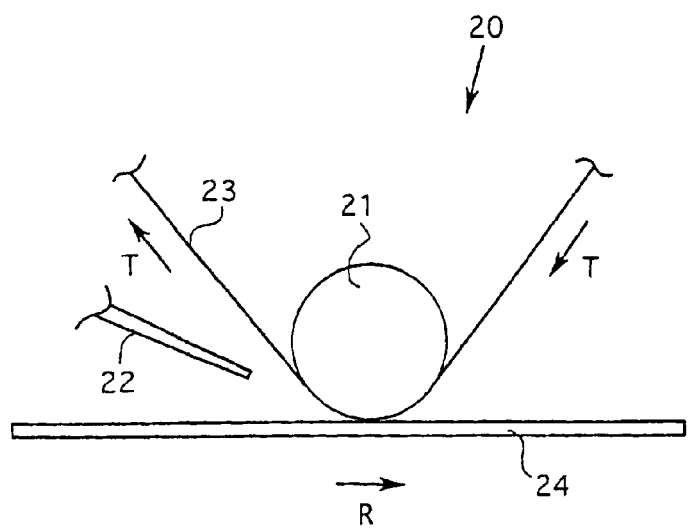
FIG. 3 is a schematic drawing showing the structure of an apparatus for texturing that may be used for a texturing method of this invention.

The texturing process can be carried out by using an apparatus 20 shown in FIG. 3.

As shown in FIG. 3, the texturing may be carried out by rotating the substrate 24 in the direction of arrow R, pressing a texturing tape 23 onto the surface of the substrate 24 through a contact roller 21 while supplying the texturing slurry of this invention described above through a nozzle 22, running the texturing tape 23 in the direction of arrows T and causing the texturing tape 23 to oscillate in the radial direction of the substrate 24.

The texturing tape 23 is made of a woven, non-woven, raised or flocked cloth material with at least its surface area (for being pressed against and substantially acting on the surface of the substrate) comprising fibers with thickness within the range between 0.1 μm and 5.0 μm. If the thickness of the fibers is less than 0.1 μm, the number of contact points between the fibers at the surface area of the texturing tape and the abrading particles in the texturing slurry becomes reduced and the abrading particles cannot be made to work sufficiently on the substrate surface. If the thickness of the fibers exceeds 5.0 μm, on the other hand, the steps between the fibers forming the surface area of the texturing tape increases and the substrate surface cannot be textured uniformly.

During the texturing process, the diamond clusters of the abrading particles of this invention are pressed onto the surface of the substrate 24 while being supported by the porous surface area of the texturing tape 23, becoming decomposed to an appropriate degree such that artificial diamond particles that comprise the diamond clusters act on the surface of the substrate 24, polishing it and forming texturing marks thereon without forming scratches.

Even if aggregated diamond clusters are formed as described above, each of the diamond clusters forming the aggregate is decomposed appropriately and the artificial diamond particles forming each diamond cluster act on the surface of the substrate 24 to polish it and to form texturing marks without forming scratches.

The invention is explained next with reference to Test Examples and Comparison Examples.

TEST EXAMPLE 1

Texturing slurry of Test Example 1 was produced as follows. First, a mixture of carbon (graphite) powder, an explosive and metal powders of copper, iron, etc. was exploded inside a container to generate diamond clusters having impurities attached therearound. This is the so-called graphite explosion shock method.

Next, in order to remove the impurities of diamond clusters, perchloric acid was used to remove residual graphite. After the diamond clusters were washed, they were placed in a beaker, a mixture of condensed nitric acid (1 weight part) and condensed hydrochloric acid (3 weight parts) was added for an acid treatment for 6 hours at normal temperature to remove the metals.

Next, after the diamond clusters were washed with pure water, a centrifugal separator was used with a wet method to separate the diamond clusters with cluster diameters within the range between 30 nm and 350 nm and the separated diamond clusters were dried. The purity of artificial diamond particles in these diamond clusters was 3.22 g/cm$^3$.

These diamond clusters (with cluster diameters within the range between 30 nm and 350 nm) were mechanically crushed by using a ball mill.

Next, in order to remove impurities of these crushed diamond clusters, they were washed and then placed in a beaker. A mixture of condensed nitric acid (1 weight part) and condensed hydrochloric acid (3 weight parts) was added for a second treatment process for 6 hours at normal temperature to remove the metals.

After these diamond clusters were washed with pure water, a centrifugal separator was used by a wet method to separately collect diamond clusters with cluster diameters within the range between 30 nm and 350 nm and the average cluster diameter (D50) 80 nm, 120 nm and 150 nm and the sampled clusters were dried.

The density of non-diamond carbon contained in the impurities of diamond clusters of these abrading particles and the density of chlorine in the impurities other than non-diamond carbon were as shown in Table 3. These densities were measured by using a phosphorescent X-ray analyzer ("ZSX100e" (trade name) produced by Rigaku Corporation).

Texturing slurry of Test Example 1 was produced by mixing these abrading particles in water, thereafter using an ultrasonic homogenizer ("US-150T" (trade name) produced by Nippon Seiki Seisakusho) to disperse them, adding glycol compound, organic phosphate, higher aliphatic acid amide and nonionic surfactant as an additive and using the aforementioned ultrasonic homogenizer again to further disperse the particles. The composition of texturing slurry of Test Example 1 was as shown in Table 1.

TABLE 1

| Composition of texturing slurry | Abrading particles | 0.05 weight % |
|---|---|---|
| | Additive | 5 weight % |
| | Pure water | 94.95 weight % |
| Composition of additive (total = 100 weight %) | Glycol compound | 50 weight % |
| | Organic phosphate | 15 weight % |
| | Higher aliphatic amide | 15 weight % |
| | Nonionic surfactant | 20 weight % |

TEST EXAMPLE 2

Texturing slurry of Test Example 2 was produced. The method of production was the same as that for Test Example 1 except the second acid treatment process for removing the impurities of separated and crushed diamond clusters was carried out by washing them, thereafter placing them in a beaker, mixing them with a mixture of condensed nitric acid (1 weight part) and condensed hydrochloric acid (3 weight parts) for an acid treatment for 6 hours at normal temperature, next washing the acid-treated diamond clusters with pure water, next placing the washed diamond clusters in another beaker, adding a mixture of condensed sulfuric acid (10 weight parts) and condensed nitric acid (1 weight part) for a heating treatment for 2 hours at 130° C., leaving them for 12 hours and then washing them with pure water.

Next, as done in Test Example 1, these diamond clusters were classified into groups by using a centrifugal separator by a wet method to collect groups of diamond clusters with cluster diameters within the range between 30 nm and 350 nm and the average cluster diameter (D50) 80 nm, 120 nm and 150 nm and the sampled clusters were dried.

The density of non-diamond carbon contained in the impurities of diamond clusters of these abrading particles and the density of chlorine in the impurities other than non-diamond carbon were as shown in Table 3. These densities were measured by using the same phosphorescent X-ray analyzer as used in Test Example 1.

TEST EXAMPLE 3

Texturing slurry of Test Example 3 was produced. The method of production was the same as that for Test Example 1 except the second acid treatment process for removing the impurities of separated and crushed diamond clusters was carried out by washing them, thereafter placing them in a beaker, adding a mixture of condensed sulfuric acid (10 weight parts) and condensed nitric acid (1 weight part) for a heating treatment for 2 hours at 130° C., leaving them for 12 hours, then washing them with pure water, next placing the washed diamond clusters in another beaker, mixing them with a mixture of condensed nitric acid (1 weight part) and condensed hydrochloric acid (3 weight parts) for an acid treatment for 6 hours at normal temperature and next washing these diamond clusters with pure water.

Next, as done in Test Example 1, these diamond clusters were classified into groups by using a centrifugal separator by a wet method to collect groups of diamond clusters with cluster diameters within the range between 30 nm and 350 nm and the average cluster diameter (D50) 80 nm, 120 nm and 150 nm and the sampled clusters were dried.

The density of non-diamond carbon contained in the impurities of diamond clusters of these abrading particles and the density of chlorine in the impurities other than non-diamond carbon were as shown in Table 3. These densities were measured by using the same phosphorescent X-ray analyzer as used in Test Example 1.

COMPARISON EXAMPLE 1

Texturing slurry of Comparison Example 1 was produced. The method of production was the same as that for Test Example 1 except the second acid treatment process for removing the impurities of separated and crushed diamond clusters was carried out by washing them, thereafter placing them in a beaker, adding a mixture of condensed sulfuric acid (10 weight parts) and condensed nitric acid (1 weight part) for a heating treatment for 2 hours at 130° C., leaving them for 12 hours, and then washing them with pure water. In other words, the second acid treatment process was carried out by using a condensed acid not containing chlorine.

Next, as done in Test Example 1, these diamond clusters were classified into groups by using a centrifugal separator by a wet method to collect groups of diamond clusters with cluster diameters within the range between 30 nm and 350 nm and the average cluster diameter (D50) 80 nm, 120 nm and 150 nm and the sampled clusters were dried.

The density of non-diamond carbon contained in the impurities of diamond clusters of these abrading particles and the density of chlorine in the impurities other than non-diamond carbon were as shown in Table 3. These densities were measured by using the same phosphorescent X-ray analyzer as used in Test Example 1.

COMPARISON EXAMPLE 2

Texturing slurry of Comparison Example 2 was produced. The method of production was the same as that for Test Example 1 except the second acid treatment process for removing the impurities of separated and crushed diamond clusters was carried out by washing them, thereafter placing them in a beaker, mixing them with a mixture of condensed nitric acid (1 weight part) and condensed hydrochloric acid (3 weight parts) for an acid treatment for 6 hours at normal temperature, next washing the acid-treated diamond clusters with pure water, next placing the washed diamond clusters in another beaker, adding a mixture of condensed sulfuric acid (10 weight parts) and condensed nitric acid (1 weight part) for a heating treatment for 2 hours at 130° C., leaving them for 12 hours and then washing them with pure water, and then adding ammonia chloride water to reduce the amount of chlorine attached to the diamond clusters in the form of ammonium chloride ($NH_4Cl$) so as to reduce the density of chlorine attached to the diamond clusters.

Next, as done in Test Example 1, these diamond clusters were classified into groups by using a centrifugal separator by a wet method to collect groups of diamond clusters with cluster diameters within the range between 30 nm and 350 nm and the average cluster diameter (D50) 80 nm, 120 nm and 150 nm and the sampled clusters were dried.

The density of non-diamond carbon contained in the impurities of diamond clusters of these abrading particles and the density of chlorine in the impurities other than non-diamond carbon were as shown in Table 3. These densities were measured by using the same phosphorescent X-ray analyzer as used in Test Example 1.

Comparison Test

Texturing slurry of Test Examples 1-3 and Comparison Examples 1-2 was each used to texture a substrate for a magnetic hard disk and the results were compared regarding the appearance of spots. Presence and absence of spots were examined by using an optical observation apparatus ("VMX-2100" (trade name) produced by Vision PSYTEC Co. Ltd.) using a 180 W metal halide light source to obtain photographs at a low magnification ratio (about 4 times) and by using these photographs.

As samples, use was made of 2.5-inch glass substrates with mirror-polished surfaces on which a surface reinforcing process was carried out. The average surface roughness (Ra) of these glass substrates was about 0.15 nm prior to the texturing process.

Texturing process was carried out by using an apparatus as shown in FIG. 3 by rotating the glass substrate, pressing a texturing tape thereonto through the contact roller while texturing slurry was supplied to the surface of the substrate, running this texturing tape and oscillating this texturing tape in the radial direction of the glass substrate. A non-woven cloth tape of thickness 700 µm comprising fibers of thickness 1 µm was used as the texturing tape.

The conditions of the texturing process are shown in Table 2 below.

TABLE 2

| | |
|---|---|
| Rotational speed of substrate | 300 rpm |
| Speed of tape | 6 cm/minute |
| Supply rate of slurry | 15 cc/minute |
| Hardness of contact roller | 45 duro |
| Oscillation frequency (amplitude) | 5 Hz (1 mm) |
| Pressure by contact roller | 4.5 kg |
| Time of processing | 30 seconds |

The results of the comparison test are shown in FIG. 3. As can be understood from Table 3, spots were not observed in Test Examples 1-3 according to this invention and texturing marks could be formed uniformly and clearly without leaving spots at average surface roughness within the range of between 3 Å and 6 Å and line density is 40 lines/µm or greater.

TABLE 3

| | Average cluster diameter (nm) | Carbon density (%) | Chlorine density (%) | Average surface roughness (Å) | Line density (lines/μm) | Presence of spots |
|---|---|---|---|---|---|---|
| Test Example 1 | 80 | 96.8 | 2.8 | 4.1 | 75 | No |
| | 120 | 96.9 | 2.6 | 5.2 | 50 | No |
| | 150 | 97.3 | 2.2 | 5.5 | 45 | No |
| Test Example 2 | 80 | 97.5 | 1.6 | 4.3 | 60 | No |
| | 120 | 98.0 | 1.5 | 5.2 | 48 | No |
| | 150 | 97.4 | 1.3 | 5.7 | 42 | No |
| Test Example 3 | 80 | 96.5 | 3.1 | 4.5 | 66 | No |
| | 120 | 96.6 | 2.9 | 5.3 | 50 | No |
| | 150 | 96.2 | 2.9 | 5.8 | 44 | No |
| Comparison Example 1 | 80 | 97.5 | 0.2 | 3.3 | 68 (unclear) | Yes |
| | 120 | 98.0 | 0.2 | 4.3 | 45 | Yes |
| | 150 | 98.0 | 0.2 | 4.5 | 40 | Yes |
| Comparison Example 2 | 80 | 97.2 | 0.2 | 3.2 | 60 (unclear) | Yes |
| | 120 | 97.5 | 0.1 | 4.1 | 41 | Yes |
| | 150 | 98.2 | 0.1 | 4.5 | 38 | Yes |

What is claimed is:

1. Texturing slurry for texturing a substrate for a magnetic hard disk, said texturing slurry comprising abrading particles and a dispersant for dispersing said abrading particles;
wherein said abrading particles comprise diamond clusters formed with artificial diamond particles with primary particle diameter of 20 nm or less and surrounded by impurities that are attached thereto, the density of non-diamond carbon in said impurities surrounding said artificial diamond particles being 95% or more and 99% or less, the density of chlorine in the impurities other than non-diamond carbon of said diamond clusters being 0.5% or more, the cluster diameter of said diamond clusters being 30 nm or more and 500 nm or less, the average cluster diameter of said diamond clusters being 30 nm or more and 200 nm or less, and said texturing slurry containing said abrading particles by 0.005 weight % or more and 0.5 weight % or less; and
wherein said dispersant comprises water and an additive, said additive containing one or more selected from the group consisting of glycol compounds, higher aliphatic amides, organic phosphates and surfactants, and said texturing slurry containing said additive by 1 weight % or more and 10 weight % or less.

2. The texturing slurry of claim 1 containing said abrading particles by 0.005 weight % or more and 0.1 weight % or less.

3. The texturing slurry of claim 1 having pH value of 8 or greater.

4. A method of texturing a substrate for a magnetic hard disk, said method comprising the steps of:
rotating said substrate;
supplying texturing slurry to surface of said substrate; and
pressing a texturing tape onto the surface of said substrate and running said texturing tape;
wherein said texturing slurry comprises abrading particles and a dispersant for dispersing said abrading particles;
wherein said abrading particles comprise diamond clusters formed with artificial diamond particles with primary particle diameter of 20 nm or less and surrounded by impurities that are attached thereto, the density of non-diamond carbon in said impurities surrounding said artificial diamond particles being 95% or more and 99% or less, the density of chlorine in the impurities other than non-diamond carbon of said diamond clusters being 0.5% or more, the cluster diameter of said diamond clusters being 30 nm or more and 500 nm or less, the average cluster diameter of said diamond clusters being 30 nm or more and 200 nm or less, and said texturing slurry containing said abrading particles by 0.005 weight % or more and 0.5 weight % or less;
wherein said dispersant comprises water and an additive, said additive containing one or more selected from the group consisting of glycol compounds, higher aliphatic amides, organic phosphates and surfactants, and said texturing slurry containing said additive by 1 weight % or more and 10 weight % or less; and
wherein said texturing tape comprises a woven, nonwoven, raised or flocked cloth material, at least a surface area of said cloth material for being pressed against the surface of said substrate comprising fibers with thickness 0.1 μm or greater and 5.0 μm or less.

5. The method of claim 4 wherein said texturing slurry contains said abrading particles by 0.005 weight % or more and 0.1 weight % or less.

6. The method of claim 4 wherein said texturing slurry has pH value of 8 or greater.

* * * * *